United States Patent
Higuchi et al.

[11] Patent Number: 5,881,028
[45] Date of Patent: Mar. 9, 1999

[54] POWER SUPPLY FOR ELECTRONIC TIMEPIECE

[75] Inventors: Haruhiko Higuchi; Kenji Fujita, both of Tanashi, Japan

[73] Assignee: Citizen Watch Co., Ltd., Tokyo, Japan

[21] Appl. No.: 945,745

[22] PCT Filed: Mar. 12, 1997

[86] PCT No.: PCT/JP97/00787

§ 371 Date: Nov. 3, 1997

§ 102(e) Date: Nov. 3, 1997

[87] PCT Pub. No.: WO97/34355

PCT Pub. Date: Sep. 18, 1997

[30]     Foreign Application Priority Data

Mar. 13, 1996  [JP]  Japan ................................ 8-055246

[51] Int. Cl.$^6$ ............................................... G04B 1/00
[52] U.S. Cl. ................................................... 368/204
[58] Field of Search ................................ 323/282, 299, 323/303; 368/203, 204, 205

[56]             References Cited

U.S. PATENT DOCUMENTS 4,441,825  4/1984  Morokawa ........................ 368/204
5,001,685  3/1991  Hayakawa ........................ 368/204
5,701,278  12/1997  Higuchi et al. .................... 368/204

FOREIGN PATENT DOCUMENTS 52-114933  9/1977  Japan .
61-59911   3/1986  Japan .
8-36072    2/1996  Japan .

*Primary Examiner*—Matthew Nguyen
*Attorney, Agent, or Firm*—Kanesaka & Takeuchi

[57]             ABSTRACT

A power supply for electronic timepieces is constituted of a mechanical power generating section (1), a power storing section (30) composed of a large-capacity secondary battery which stores power generated by the section (1), a voltage detecting section (4) which detects the voltage at the section (30), an overcharging preventive section (5) which is controlled by the section (4) and permits the electric current generated by the section (1) to flow therethrough, a diode (2) connected between the sections (1 and 5), and a switching transistor (7) which is connected between the sections (5 and 30), and turned off when the section (5) starts to discharge so as to improve the voltage resistance and charging efficiency.

5 Claims, 4 Drawing Sheets

POWER SUPPLY FOR ELECTRONIC TIMEPIECE

FIELD OF THE INVENTION

This invention relates to a power supply unit for an electronic timepiece, and, especially to a power supply unit for an electronic timepiece using a mechanical generator as a power generating section.

DESCRIPTION OF THE BACKGROUND ART

In the past, an electronic timepiece which is operated by electric energy converted from mechanical energy generated by the rotation of an eccentric weight was developed and produced commercially. Also, a power supply unit used for an electronic timepiece is proposed, for example, in Japanese Patent Publication (KOKOKU) No. 52229/1995.

FIG. 3 is a view of a circuit block diagram of a power supply unit for a conventional electronic timepiece.

In FIG. 3, a power generating section 1 comprises a rotating means 11 composed of an eccentric weight or the like, an accelerating oscillating wheel 12 for accelerating the rotation of the rotating means 11, a rotor 13, a generating coil 14 which generates an AC current corresponding to the rotation of the rotor 13, and the like. A diode 2 rectifies the AC current generated by the generating coil 4 and prevents the reversal of the flow of current from a battery section 3 illustrated below.

Also, a voltage detecting section 4 outputs a signal when the potential of the battery section 3 exceeds a prescribed value. An overcharging preventive section 5 is operated by the signal from the voltage detecting section 4 to prevent overcharge exceeding the withstand voltage of the battery section 3. In this case, the battery section 3, which is composed of a condenser with a large capacity, accumulates the electric power generated by the generating coil 14 and outputs this electric power to a timepiece circuit 6.

In the power supply unit of this conventional electronic timepiece, when the rotating means 11 such as an eccentric weight or the like installed in a wrist timepiece is rotated corresponding to the hand shaking action of the user, the rotation is accelerated by the accelerating wheel 12 and transferred to the rotor 13. The rotor 13 is composed of a permanent magnet, which is rotated to generate an AC current in the generating coil 14. This AC current is rectified by the diode 2 and accumulated in the large-capacity condenser 3 used as an power storing section. This accumulated power allows the timepiece circuit 6 to operate, thus driving the electronic timepiece.

Then, sufficient electric power is stored in the large capacity condenser 3. When the electric power exceeds the prescribed voltage (for example, 2.5 V), the voltage detecting section 4 outputs a detection signal at an "L" level to operate the overcharging preventive section 5 composed of a PMOS transistor. In this manner, the AC current generated in the power generating section 1 is discharged from the overcharging preventive section 5 so that it is not accumulated in the large capacity condenser 3.

Therefore, the potential of the large-capacity condenser 3 never exceeds the prescribed value and hence the breakdown of the condenser 3 caused by high voltage is prevented. Here, the overcharging preventive section 5 is disposed closer to the battery section 3 than the position of the diode 2 to avoid the breakdown caused by high voltage when the diode 2 generates a reverse current. Generally, the maximum AC current generated by the generating coil 14 is in the order of tens of mA. Therefore, in order for the overcharging preventive section 5 to function sufficiently, the resistance of the overcharging preventive section 5 in operation is required to be in the order of tens of ohms in the case where the withstanding voltage of the large capacity condenser 3 is in the order of 2.5 V.

A titanium-lithium ion secondary battery with a large capacity (hereinafter called "secondary battery") has recently been utilized as the battery section instead of the large-capacity condenser. However, because the internal resistance of this titanium-lithium ion secondary battery is as large as tens to hundreds of ohms, the potential of the secondary battery exceeds the prescribed value if the secondary battery is used for conventional electronic timepieces as shown in FIG. 3.

Accordingly, if the resistance of the overcharging preventive section 5 is in the order of tens of ohms, as is conventional when the overcharging preventive section 5 starts discharging the current generated from the generating coil 14, the overcharging preventive section 5 exhibits a voltage drop across the internal resistance of the secondary battery. As a result, the voltage detecting section 4 indicates its inability to output a detection signal whereby the action of the overcharging preventive section 5 is suspended.

Then, if the action of the overcharging preventive section 5 stops, the potential of the secondary battery is allowed to ascend. The voltage detecting section 4 detects an excess of voltage to allow the overcharging preventive section 5 to start the action again. Specifically, the above procedures are repeated only by substituting the large capacity condenser for the battery section in the conventional units with a large-capacity titanium-lithium ion secondary battery. This causes an intermittent discharge action, resulting in insufficient discharge. Also, the voltage supplied to the timepiece circuit 6 is unstable resulting in fear of hindrance to the action of the timepiece.

On the other hand, a power supply unit of an electronic wrist timepiece proposed in Japanese Patent Applications Laid-open No. 236332/1986 and No. 324166/1994 has a structure in which, as shown in FIG. 4, a first diode 41 for preventing a reverse current is connected in series between a power generating section 1 and a secondary battery 3, and a second diode 42 for preventing a reverse current is connected in series with a MOS transistor 5 used as an overcharging preventive section.

This conventional technology indicates its ability to prevent the erroneous detection of the voltage caused by the internal resistance of the secondary battery by turning on the MOS transistor and developing a short across the power generating section when the potential of the secondary battery is detected. Also, the diode 42 prevents the reverse current caused by a parasitic diode created in the MOS transistor 5 to avoid a reduction in generating efficiency of the AC current generating section.

Incidentally, when the rotating means 11 constituted of an eccentric weight or the like is used to generate electric power, there is the case where an extremely large voltage is generated by rapid rotation of the eccentric weight. In the case of using a conventional power supply unit, there is the problem that diodes which can withstand high voltage must be used as the diodes 41 and 42 for preventing a reverse current flow.

Accordingly, it is an object of the present invention to provide a power supply unit for an electronic timepiece, operated by generating an AC voltage by a power generating section using a rotating means constituted of an eccentric weight or the like and by charging a battery section such as titanium-lithium ion secondary battery or the like which has a large capacity and a comparatively large internal resistance, wherein the power supply unit uses only one diode, which withstands high voltage, and is superior in charging efficiency.

SUMMARY OF THE INVENTION

The above object can be attained in the present invention by the provision of a power supply unit for an electronic timepiece provided with a mechanical power generating section and a battery section, comprising:

a voltage detecting section for detecting the potential of the battery section;

an overcharging preventive section for discharging the current generated by the power generating section, the overcharging preventive section being controlled by the voltage detecting section; and a diode for preventing a reverse current flow, the diode being connected between the power generating section and the battery section (the voltage detecting section, the overcharge preventing section); wherein a reverse current preventive section constituted of a switching transistor which is turned off when the overcharging preventive section discharges is connected between the overcharging preventive section and the battery section.

More specifically, the overcharging preventive section is constituted of a switching transistor having a function inverse to the function of the switching transistor of the reverse current preventive section and functions inversely at the same time by a signal from the voltage detecting section.

By this technology using only one diode which withstands a high voltage and a switching transistor, the withstand voltage characteristics and charging efficiency in a power supply unit provided with a mechanical power generating section which suddenly generates a high voltage can be improved.

BRIEF DESCRIPTIONS OF THE DRAWINGS

PREFERRED EMBODIMENT OF THE INVENTION

A preferred embodiment of a power supply unit in the present invention will be explained in more detail with reference to the drawings.

Figure 1:
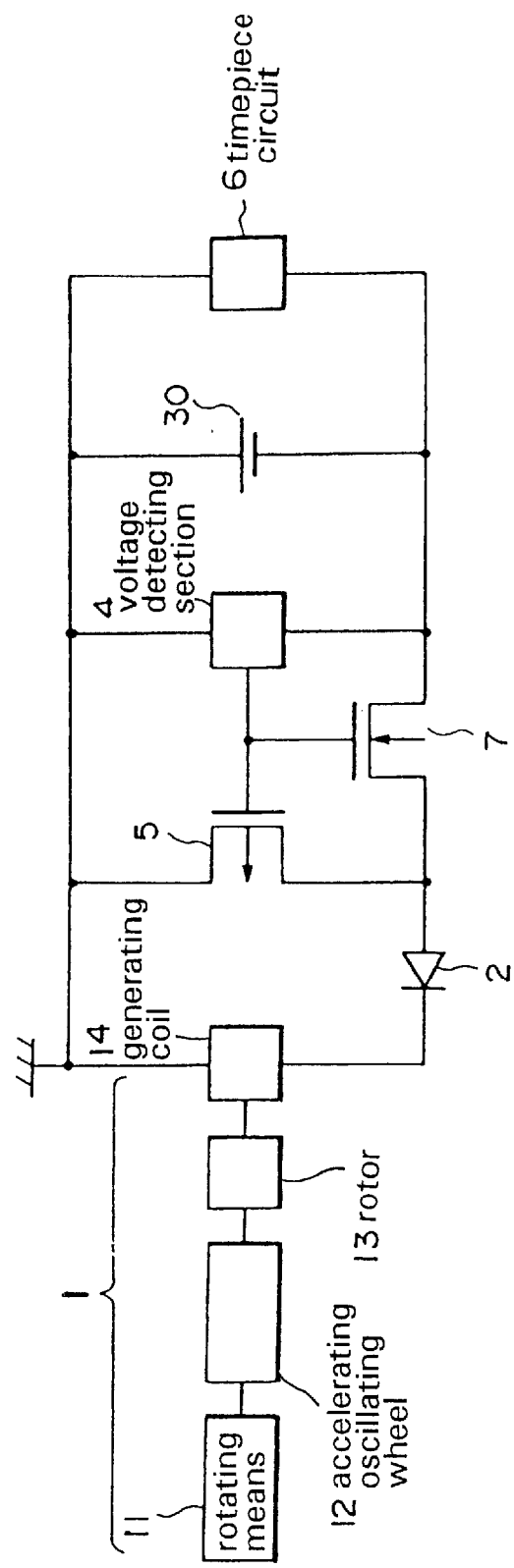
FIG. 1 is a block diagram showing a first embodiment of a power supply unit in an electronic timepiece of the present invention.
Figure 3:
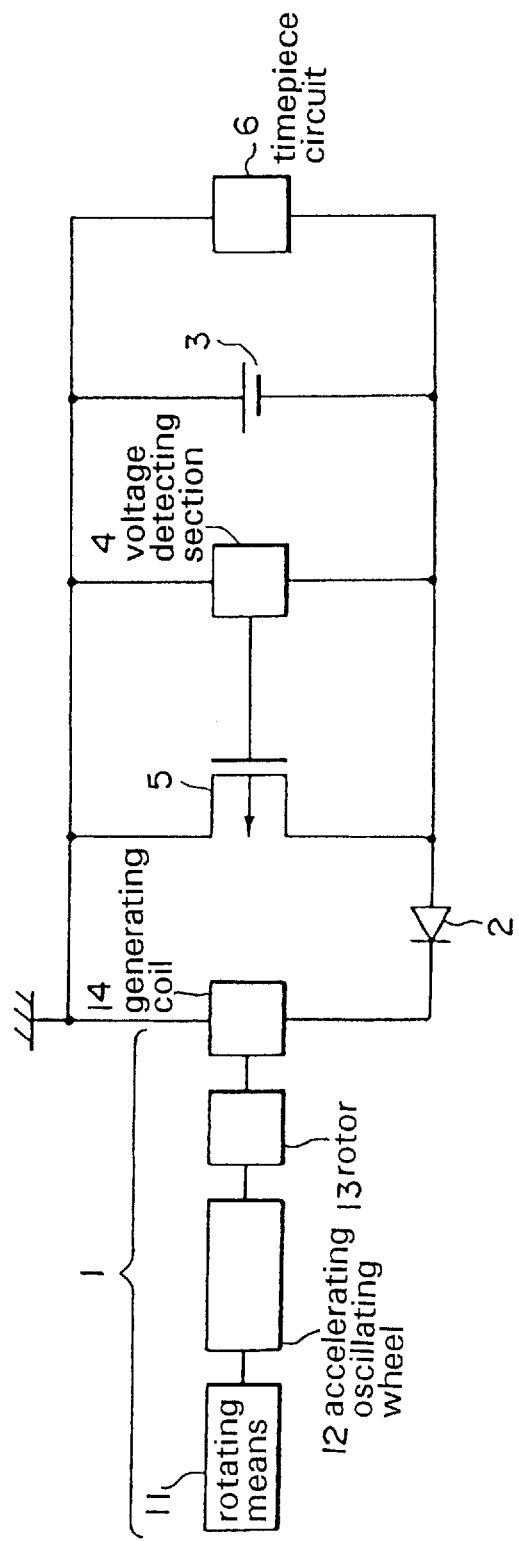
FIG. 3 is a block diagram showing an example of prior art for a power supply unit in a conventional electronic timepiece.
Figure 4:
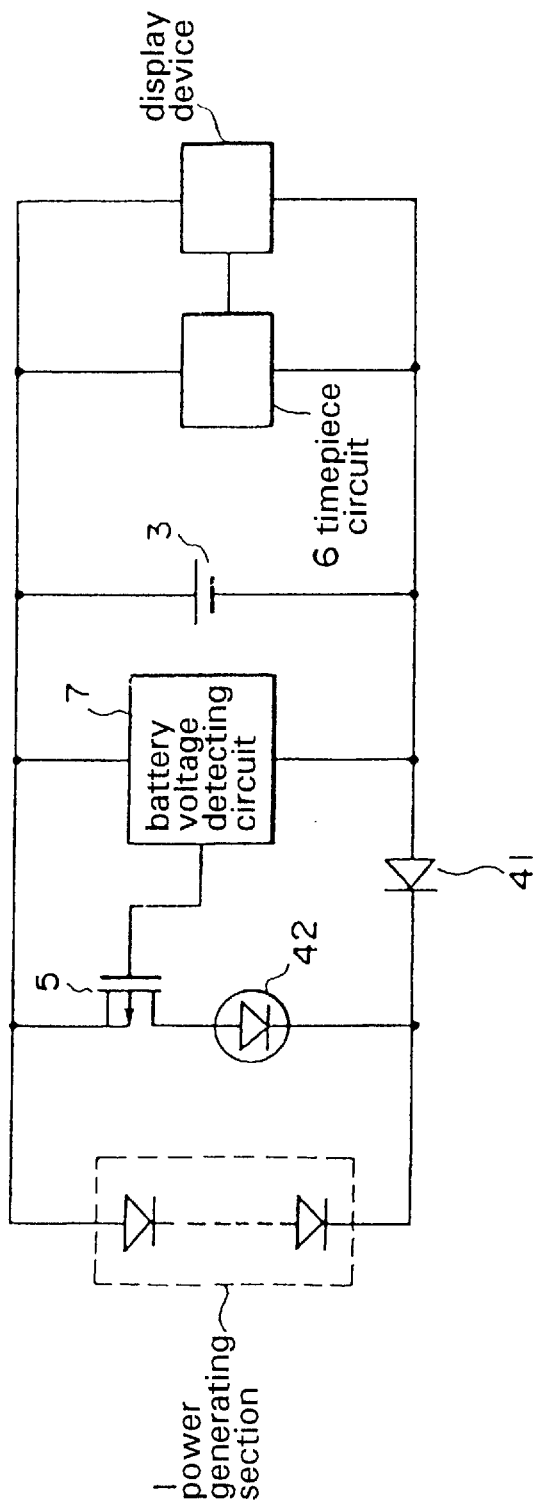
FIG. 4 is a block diagram showing another example of prior art for a power supply unit in a conventional electronic timepiece.

FIG. 1 is a block diagram of a power supply unit in an electronic timepiece corresponding to a first embodiment of the present invention. The same parts as in FIG. 3 are described by the same symbols.

In the embodiment of the present invention, a diode which withstands a high voltage is used as a diode 2 and is connected between a power generating section 1 and a battery section 30, a voltage detecting section 4, and an overcharging preventive section 5. This structure is so designed that an extremely high voltage which is suddenly generated by the mechanical power generating section 1 is never applied to the voltage detecting section 4 and the overcharging preventive section 5. Therefore, it is unnecessary to use devices which withstand high voltage for the voltage detecting section 4 and the overcharging preventive section 5, thereby reducing the costs.

In addition, a secondary battery such as titanium-lithium ion secondary battery or the like having a comparatively large internal resistance and a large capacity is used as the battery section 30.

Also, a switching transistor composed of a NMOS transistor or the like is installed as a reverse current preventive section 7. Specifically, a switching transistor having an inverse function to that of a PMOS transistor for the overcharging preventive section 5 is used.

In the power supply unit of the electronic timepiece corresponding to the embodiment of the present invention, the voltage detecting section 4 outputs a signal at an "H" level when the potential of the secondary battery forming the battery section 30 is below the prescribed voltage (for example, 2.5 V). In this condition, the reverse current preventive section 7 is on and the overcharging preventive section 5 is off so that the power generated by the power generating section 1 is charged in the secondary battery.

In a short time, the potential of the secondary battery exceeds 2.5 V and then the voltage detecting section 4 outputs a signal at an L level. The overcharging preventive section 5 is on and, at the same time, the reverse current preventive section 7 is off. As a result, the current generated by the power generating section 1 is discharged by the overcharging preventive section 5 and is not charged to the secondary battery. At this time, because the reverse current preventive section 7 is off, the overcharging preventive section 5 is never connected electrically with the secondary battery whereby a voltage drop across the secondary battery is avoided.

As mentioned above, in the power supply unit corresponding to this embodiment, the reverse current preventive section 7 composed of a switching transistor, which is off while the overcharging preventive section 5 is discharging, is installed between the overcharging preventive section 5 and the secondary battery. Therefore, a voltage drop across the secondary battery never appears during the discharge from the overcharging preventive section 5 and hence a stable discharge action is attained until the potential of the secondary battery is below 2.5 V. It is apparent from the above explanation that the power supply unit corresponding to this embodiment is efficiently used in electronic timepieces such as an electronic wrist timepiece provided with an overcharging preventive section, especially in the case where the resistance of the action of the overcharging preventive section is of the same order as the internal resistance of the battery section.

Also, the switching transistors having inverse functions are used as the overcharging preventive section 5 and the reverse current preventive section 7 respectively and these transistors are allowed to function inversely at the same time by one signal from the voltage detecting section 4 so that the action is accurate and the circuit structure is simple.

Figure 2:
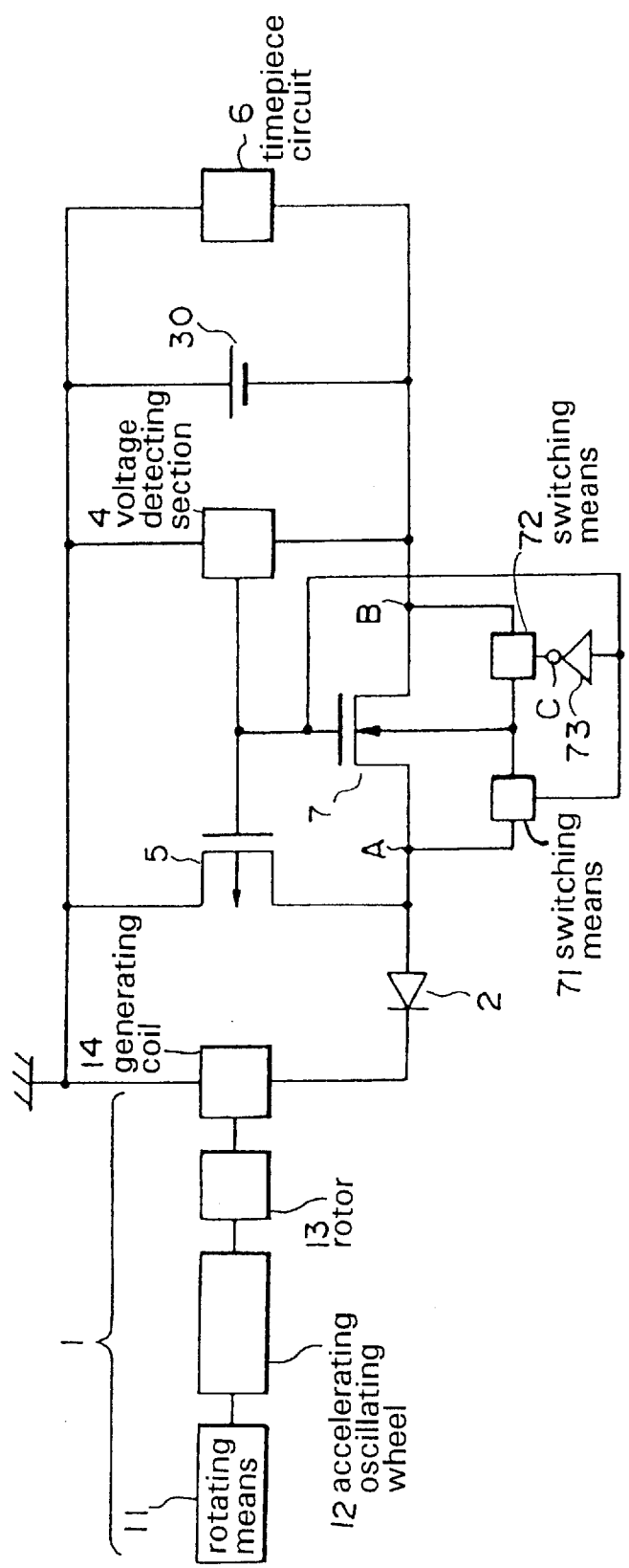
FIG. 2 is a block diagram showing a second embodiment of a power supply unit in an electronic timepiece of the present invention.

FIG. 2 is a block diagram showing a power supply unit in an electronic timepiece of a second embodiment of the present invention.

In this embodiment, a plurality of switching means 71 and 72 which are both turned on when a control terminal C reaches the "H" level is respectively connected between a substrate and a drain and between the substrate and a source of a NMOS transistor which constitutes a reverse current preventive section 7. The signal from a voltage detecting section 4 is directly input into the control terminal C of the switching means 71, and into the control terminal C of the switching means 72 after it is reversed by an inverter 73.

In this power supply unit, if electric power is generated at the usual time, specifically when the potential of a battery section 30 is below the prescribed voltage (for example, 2.5 V), in other words, when an overcharging preventive section 5 is off, the potentials of the point A and the point B satisfy the relation A<B. At this time, it is necessary to connect a bulk with the side of the point A to allow the switching transistor of the reverse current preventive section 7 to function normally. In this case, the switching means 71 and 72 may be controlled so that the switching means 71 is on and the switching means 72 is off.

Usually, the signal output from the potential detection section 4 is at the "H" level and hence the switching means 71 is on and the switching means 72 is off, whereby a normal operation is performed.

On the other hand, when the potential of the battery section 30 exceeds the prescribed voltage (for example, 2.5 V) during discharge, the potentials of the point A and the point B satisfy the relation A>B. At this time, it is necessary to connect a bulk with the side of the point B to allow the switching transistor of the reverse current preventive section 7 to function normally. In this case, the switching means 71 and 72 may be controlled so that the switching means 71 is off and the switching means 72 is on.

At discharge time, the signal output from the voltage detecting section 4 is at the "L" level and hence the switching means 71 is off and the switching means 72 is on, whereby a normal operation is performed.

In the power supply unit of the electronic timepiece in this embodiment, the switching transistor of the reverse current preventive section 7 is allowed to function without fail.

INDUSTRIAL APPLICABILITY

As is clear from the above explanation, the power supply unit of the present invention for an electronic timepiece is suitable for power supplies for electronic timepieces such as an electronic wrist watch or the like.

What is claimed is:

1. A power supply unit for an electronic timepiece, comprising:

a mechanical power generating section;

a battery section for accumulating an electric power generated by the power generating section, the battery section being composed of a secondary battery with a large capacity;

a voltage detecting section for detecting a potential of the battery section; and an overcharging preventive section for discharging a current generated by the power generating section, the overcharging preventive section being controlled by the voltage detecting section; wherein a diode is connected between the mechanical power generating section and the overcharge preventing section and a reverse current preventive section composed of a switching transistor is connected between the overcharging preventive section and the battery section, the switching transistor being turned off when the overcharging preventive section discharges.

2. The power supply unit for an electronic timepiece according to claim 1, wherein the reverse current preventive section is operated by a signal from the voltage detecting section.

3. The power supply unit for an electronic timepiece according to claim 2, wherein the overcharging preventive section is a switching transistor which has a function inverse to the function of the switching transistor of the reverse current preventive section and is allowed to function inversely at the same time by a signal from the voltage detecting section.

4. The power supply unit for an electronic timepiece according to claim 3, wherein two switching means are respectively connected between a substrate and a drain, and between the substrate and a source of the switching transistor of the reverse current preventive section.

5. The power supply unit for an electronic timepiece according to claim 4, wherein the two switching means are allowed to be turned on and off alternately by the signal from the voltage detecting section.

* * * * *